(12) United States Patent
Yamakado et al.

(10) Patent No.: US 7,747,074 B2
(45) Date of Patent: Jun. 29, 2010

(54) SELECTION OF DECORATIVE PICTURE SUITABLE FOR INPUT PICTURE

(75) Inventors: Hitoshi Yamakado, Nagano-ken (JP); Yu Gu, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1354 days.

(21) Appl. No.: 10/957,187

(22) Filed: Oct. 1, 2004

(65) Prior Publication Data
US 2005/0146537 A1    Jul. 7, 2005

(30) Foreign Application Priority Data
Oct. 2, 2003    (JP)    ............... 2003-344059

(51) Int. Cl.
G06K 9/34    (2006.01)
G09G 5/00    (2006.01)

(52) U.S. Cl. .................. 382/171; 345/629; 345/632; 382/173

(58) Field of Classification Search ............... 382/171, 382/173; 345/629, 632
See application file for complete search history.

(56) References Cited

U.S. PATENT DOCUMENTS

| | | | |
|---|---|---|---|
| 6,587,596 B1 * | 7/2003 | Haeberli | 382/283 |
| 7,000,192 B2 * | 2/2006 | Allen et al. | 715/764 |
| 7,298,520 B2 * | 11/2007 | Ohkubo et al. | 358/1.18 |
| 7,426,295 B2 * | 9/2008 | Yamakado et al. | 382/162 |
| 2003/0021468 A1 * | 1/2003 | Jia et al. | 382/162 |

FOREIGN PATENT DOCUMENTS

| | | |
|---|---|---|
| JP | 10-320576 | 12/1998 |
| JP | 2002-300363 | 10/2002 |
| JP | 2003-162718 | 6/2003 |
| WO | WO 03/012678 A2 * | 2/2003 |

OTHER PUBLICATIONS

Abstract of Japanese Patent Publication No. 2002-300363, Pub. Date: Oct. 11, 2002, Patent Abstracts of Japan.
Abstract of Japanese Patent Publication No. 2003-162718, Pub. Date: Jun. 6, 2003, Patent Abstracts of Japan.
Abstract of Japanese Patent Publication No. 10-320576, Pub. Date: Dec. 4, 1998, Patent Abstracts of Japan.

* cited by examiner

*Primary Examiner*—Bhavesh M Mehta
*Assistant Examiner*—Bernard Krasnic
(74) *Attorney, Agent, or Firm*—Martine Penilla & Gencarella, LLP

(57) ABSTRACT

A system and method for adding decorative images to a plurality of input images allows the decorative images to be easily selected. An image processing device includes a decorative image storage unit configured to store a plurality of decorative images, and a representative color acquisition unit configured to acquire a representative color for each of the input images by analyzing the input images. A decorative image selecting unit selects a decorative image to be added to each of the input images based on the representative color of the input image. An output image generating unit generates an output image by individually synthesizing the decorative images with a same pattern and the input images.

8 Claims, 15 Drawing Sheets

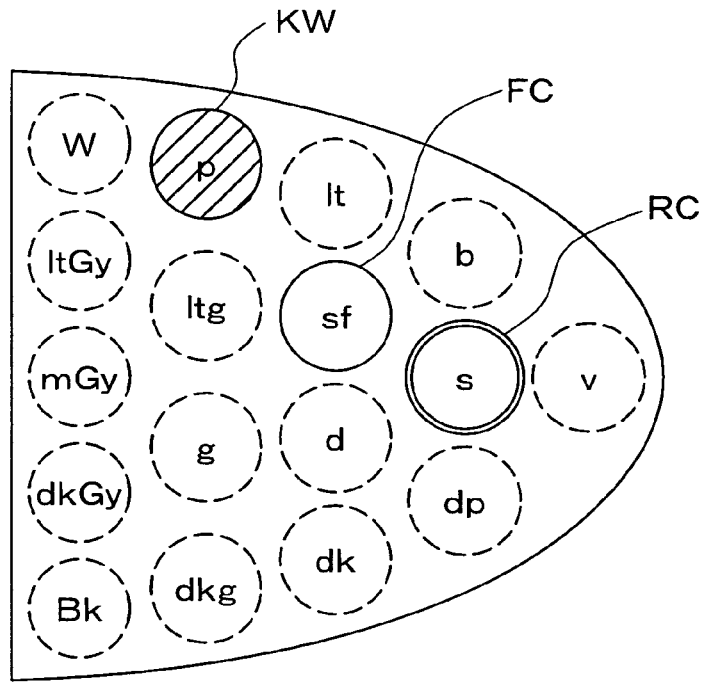

Fig.14(a)

| TONE | KEYWORD |
|---|---|
| p : PALE | THIN, LIGHT, FEMININE, DIM, CUTE |
| lt : LIGHT | SHALLOW, CHILDISH, SOFT, PLEASANT |
| b : BRIGHT | BRIGHT, VIGOROUS, GOOD-HUMORED, FLORID |
| v : VIVID | DISTINCT, BRILLIANT, BOLD, AGILE |
| ltg : LIGHT GRAYISH | DOCILE, ETC. |
| sf : SOFT | SOFT, ETC. |
| s : STRONG | STRONG, ENERGETIC, ROBUST |
| g : GRAYISH | CONSERVATIVE |
| d : DULL | DULL, ETC |
| dkg : DARK GRAYISH | HEAVY, SOLID, MALE |
| dk : DARK | ADULT-LIKE, MATURE |
| dp : DEEP | PROFOUND, DEEP, TRADITIONAL, JAPANESE STYLE |

Fig.14(b)

SELECTION OF DECORATIVE PICTURE SUITABLE FOR INPUT PICTURE

CROSS-REFERENCE TO RELATED APPLICATIONS

The present application claims the priority based on Japanese Patent Application No. 2003-344059 filed on Oct. 2, 2003, the disclosure of which is hereby incorporated herein by reference in its entirety.

BACKGROUND OF THE INVENTION

1. Field of the Invention

The present invention relates to a technique for selecting a decorative image which is added to an input image individually.

2. Description of the Related Art

When an image input from an image input device such as a digital still camera are output to an image output device such as a display or printer, a decorative image may be added to the input image. Such decorative image is selected from a plurality of decorative images through the user's own judgment based on features of the input image such as color tone.

However, many decorative images with different patterns and color tone may cause the user to make decisions on a large number of combinations of the decorative images and the input image, which imposes a significant burden on the user when selecting a decorative image.

SUMMARY OF THE INVENTION

An object of the present invention is to select a decorative image added to individual input image easily.

In order to solve at least part of the above object, an image processing method according to the present invention is an image processing method for adding a decorative image to an individual input image comprises acquiring a representative color of the input image by means of analyzing image data representing the input image; and selecting a decorative image to be added to the input image from a plurality of decorative images based on the representative color.

In this arrangement, since a decorative image which is suitable for representative color of an input image is selected, the burden imposed on the user in selecting a decorative image may be reduced.

The invention can be realized in a variety of embodiments, such as image processing methods and image processing devices, printing methods and printing devices, computer programs for executing the functions of such devices or methods, and recording media on which such computer programs are recorded.

These and other objects, features, aspects, and advantages of the present invention will become more apparent from the following detailed description of the preferred embodiments with the accompanying drawings.

BRIEF DESCRIPTION OF THE DRAWINGS

FIGS. 14(a) and 14(b) illustrate the determination of the best color based on representative color RC of the input image IP and the keyword KW.

DESCRIPTION OF THE PREFERRED EMBODIMENT

Preferred embodiments of the invention are illustrated with examples in the following order.
A. First Embodiment
B. Second Embodiment
C. Third Embodiment
D. Fourth Embodiment
E: Fifth Embodiment
F: Sixth Embodiment
G: Variants

A. First Embodiment

Figure 1:
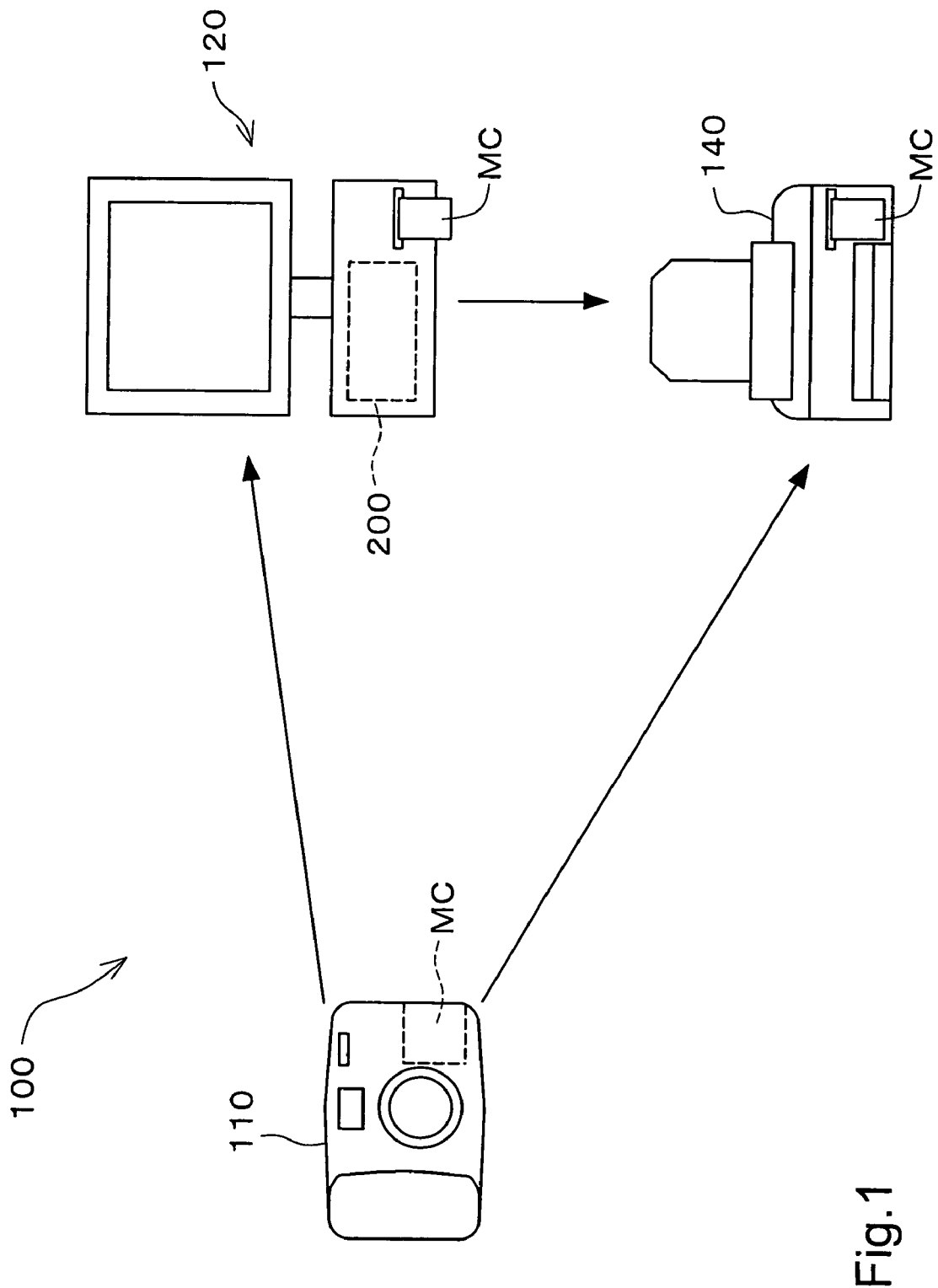
FIG. 1 illustrates an image processing system 100 as an example of the invention.

FIG. 1 illustrates an image processing system 100 as an example of the invention. The image processing system 100 comprises a digital still camera 110, personal computer 120, and color printer 140. A image processing device 200 incorporated in the personal computer 120 generates output images from input images represented by image data created by the digital still camera 110. The image quality of the output images that are generated is adjusted by operating the image processing device 200. Output images with adjusted image quality are output by the color printer 140, which is the output device.

The image processing device 200 is incorporated in the personal computer 120 in this embodiment, but the image processing device 200 can also be incorporated in the color printer 140, and the image processing device 200 may also be incorporated in the digital still camera 110.

Figure 2:
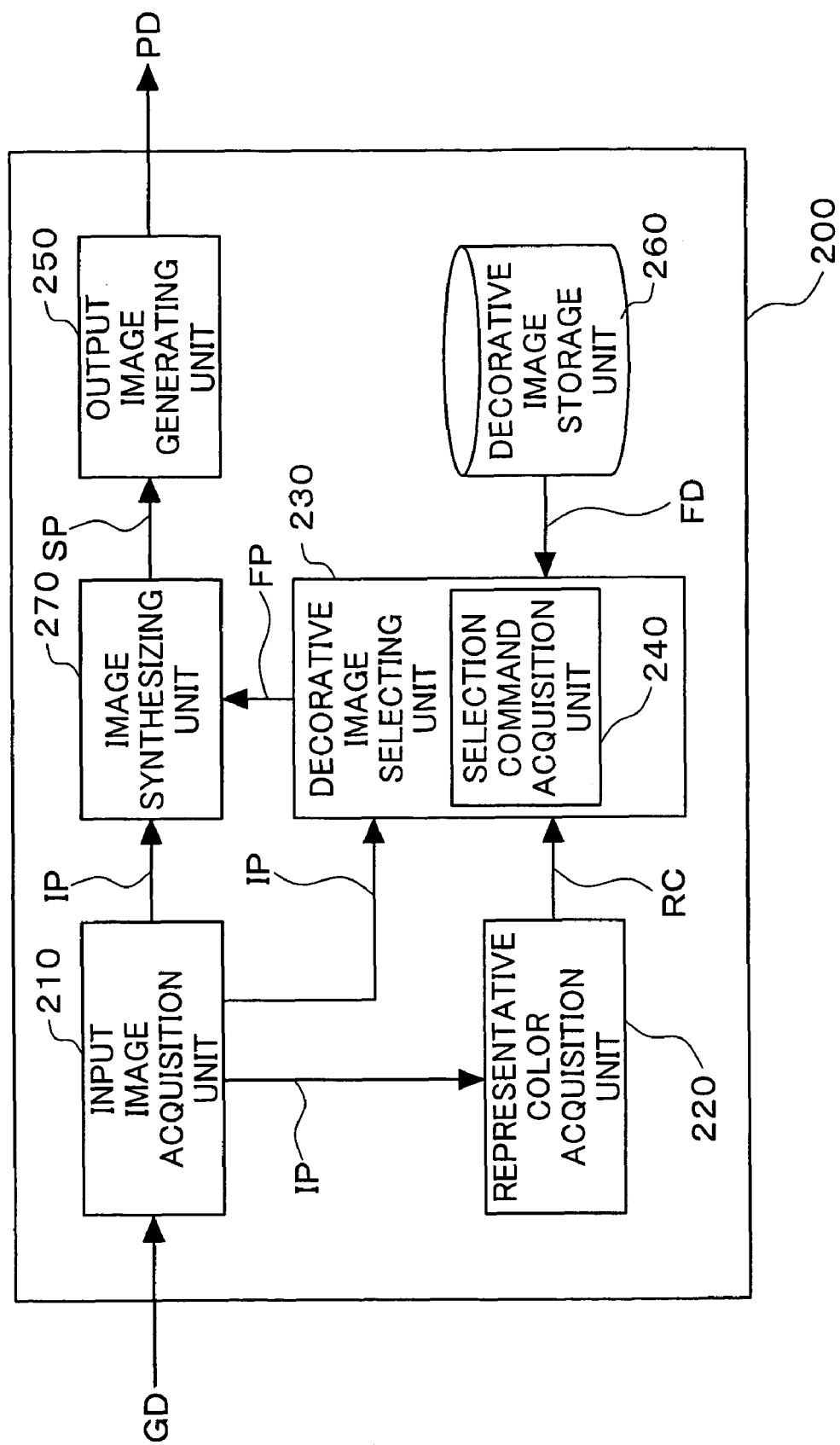
FIG. 2 is a block diagram of the structure of the image processing device 200 in the first embodiment.

FIG. 2 is a block diagram of the structure of the image processing device 200 in the first embodiment. The image processing device 200 comprises an input image acquisition unit 210, representative color acquisition unit 220, decorative image selecting unit 230, output image generating unit 250, decorative image storage unit 260, and image synthesizing unit 270.

The image processing device 200 adds a decorative image FP to each of a plurality of input images IP represented by the image data GD and generates a plurality of synthesized images SP. The plurality of synthesized images SP are laid out to generate one output image. The image quality of the output image is adjusted, and output data (printer data) PD is output to the printer 140.

Figure 3A:
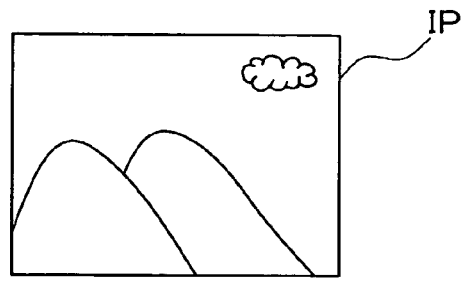
FIGS. 3(a) through 3(c) illustrate a decorative image FP being added to an input image IP.
Figure 3B:
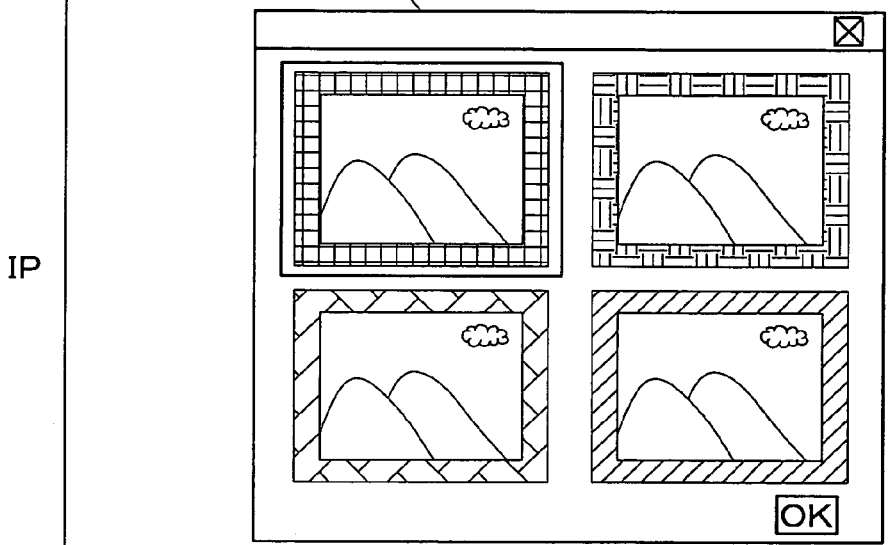
Figure 3C:
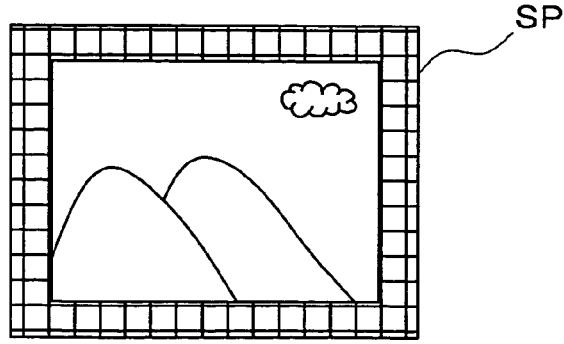

FIGS. 3(*a*) through 3(*c*) illustrate a decorative image FP being added to an input image IP. The input image acquisition unit 210 retrieves an input image IP from the image data GD as illustrated in FIG. 3(*a*). The representative color acquisition unit 220 acquires a representative color RC of the input image IP by analyzing the input image IP that has been acquired. Colors in which the RGB components are the average values of each RGB component for all pixels in the input image IP (referred to below as "average color") can be used as a representative color RC.

The decorative image selecting unit 230 selects a plurality of decorative image candidates from the decorative image storage unit 260 which are suitable for the representative color RC of the input image IP. Data indicating the representative color FC of the decorative image FP is embedded as tag data in the decorative image data stored in the decorative image storage unit 260. In this embodiment, the decorative image selecting unit 230 selects a plurality of decorative images FP (decorative image candidates) in which the representative color FC is similar to the representative color RC of the input image IP.

Figure 4:
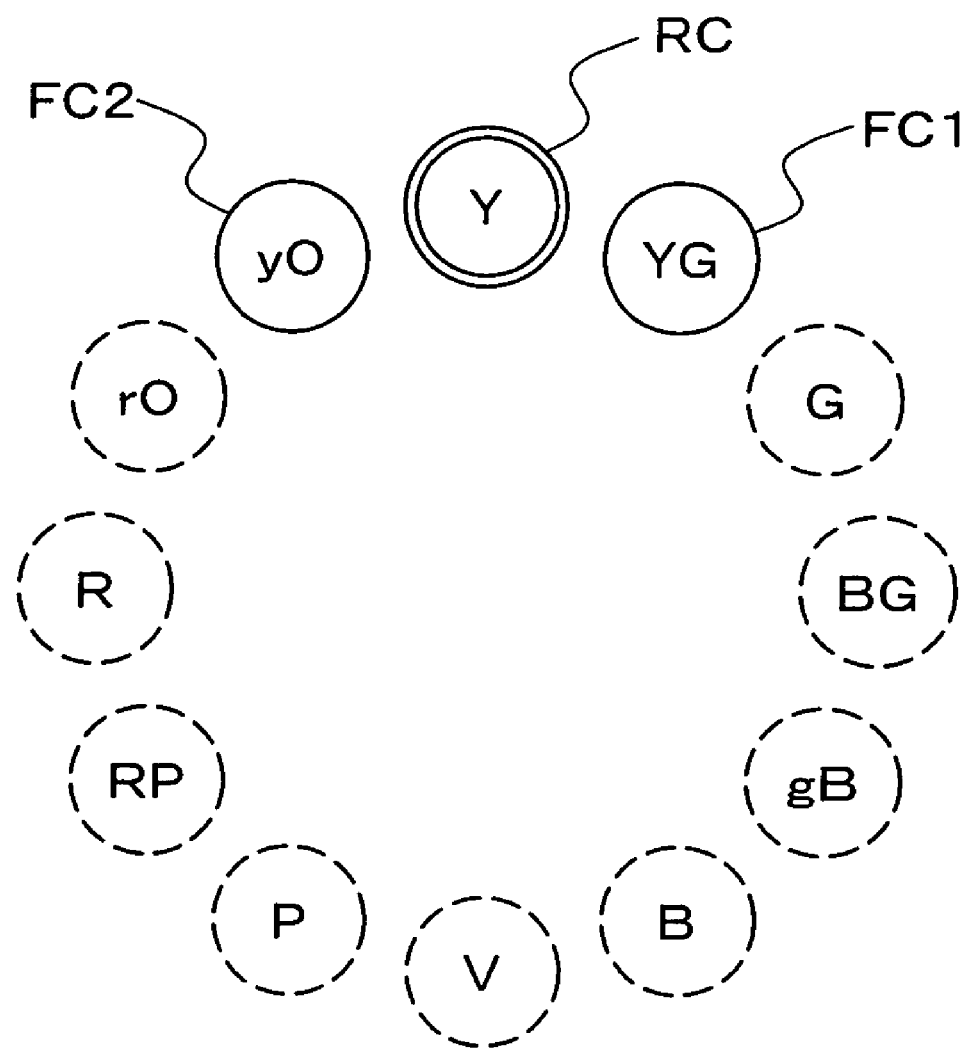
FIG. 4 illustrates the selection of the color of the decorative image FP based on the representative color RC of the input image IP.

FIG. 4 illustrates the selection of the color of the decorative image FP based on the representative color RC of the input image IP. FIG. 4 illustrates a hue circle of 12 segments based on the Japan Color Research Institute color system (PCCS). The hue circle is composed of 8 colors comprising the four psychological primary colors of red, yellow, green, and blue as well as their psychological complementary colors, and four additional colors to establish a uniform pace between hues, for a total of 12 colors. Adjacent hues thus look similar.

The decorative image FP should have a representative color FP that is similar to the representative color RC of the input image IP so that the combination of the input image IP and decorative image FP will not produce a jarring effect. In the first embodiment, to ensure that the representative colors RC and FC are similar colors, a decorative image FP is selected in which the representative color FP is a color within ±30° of the hue of the representative color RC in the PCCS hue circle.

For example, when the representative color RC is yellow Y, which is represented by a double circle in FIG. 4, colors having a hue within ±30° of the hue of the representative color RC would be colors between the adjacent yellow green YG and yellowish orange yO in the hue circle shown in FIG. 4. The decorative image selecting unit 230 (FIG. 2) thus selects a plurality of decorative images FP in which the representative color FC is a color having a hue within FC1 to FC2.

A select command acquisition unit 240 displays the combinations of the input image IP and the plurality of selected decorative images FP, and accepts the details of the select command by the user. In the example in FIG. 3(*b*), the select command acquisition unit 240 produces thumbnails of combinations of the input image IP and each decorative image. The thumbnail images that have been produced are displayed on a user interface screen (dialog) UI. The user selects a thumbnail displayed on the dialog UI. The results of the decorative image FP selected by the user are acquired by the select command acquisition unit 240.

The decorative image selecting unit 230 supplies the decorative image FP to the image synthesizing unit 270 according to the user commands acquired by the select command acquisition unit 240. The image synthesizing unit 270 synthesizes a synthesized image SP in which a decorative image FP has been added to the input image IP, as illustrated in FIG. 3(*c*).

Figure 5:
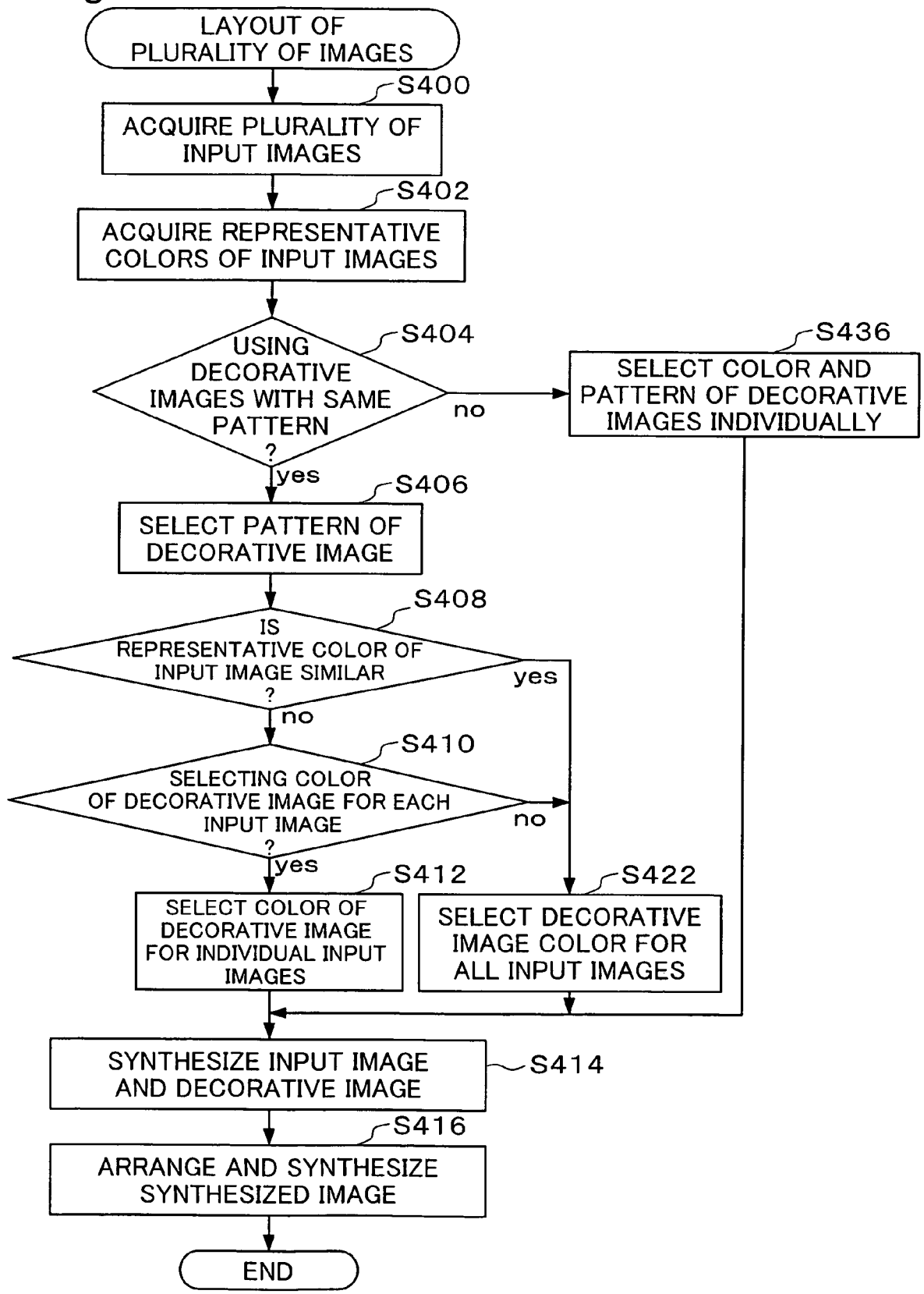
FIG. 5 is a flow chart of the generation of an output image from a plurality of input images.
Figure 6:
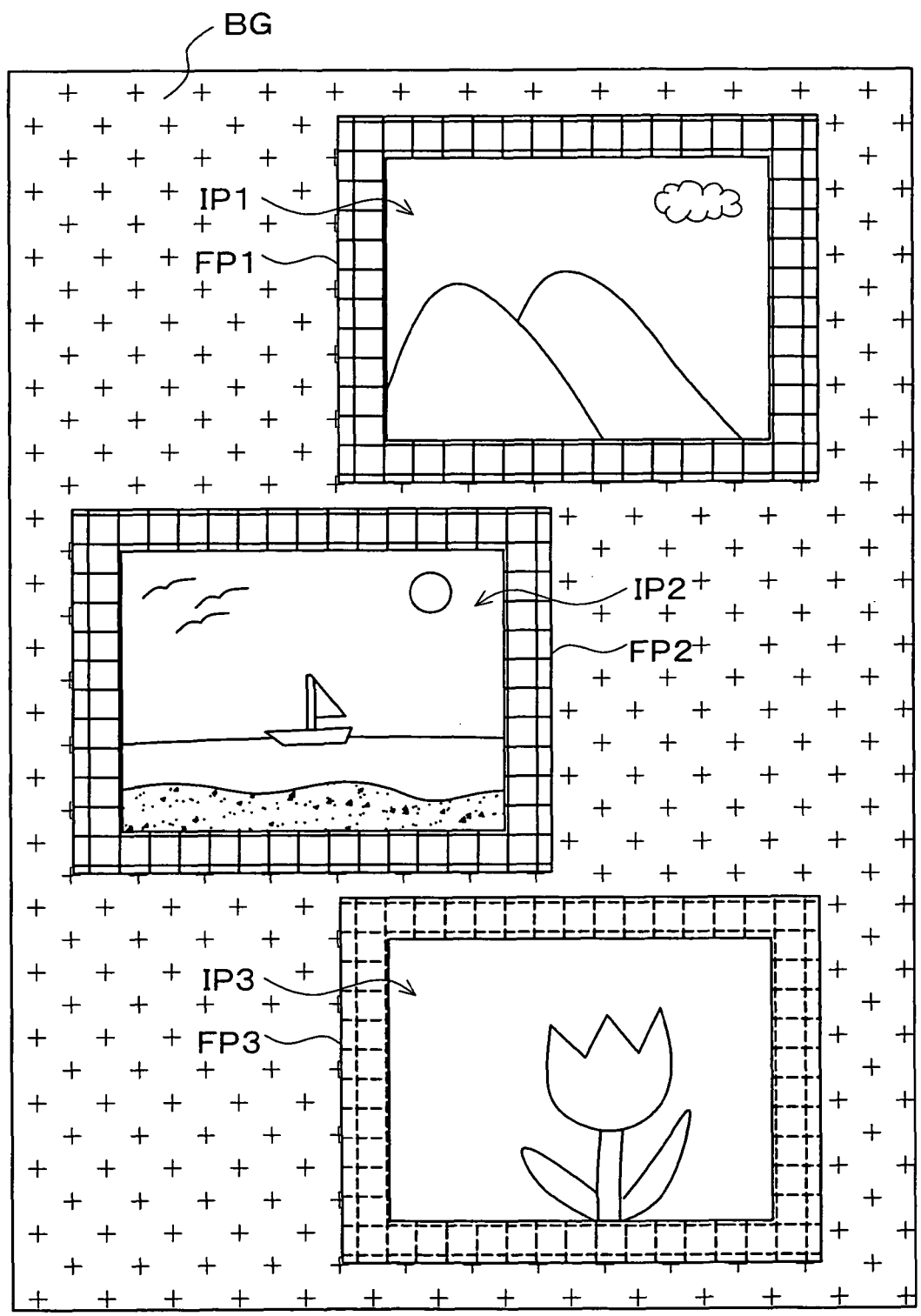
FIG. 6 illustrates an output image generated result from a plurality of input images.

FIG. 5 is a flow chart of the generation of an output image from a plurality of input images. FIG. 6 illustrates the results of the process.

In Step S400, the input image acquisition unit 210 acquires a plurality of input images from the input image data GD. In Step S402, representative colors corresponding to each image are obtained from the plurality of input images supplied to the representative color acquisition unit 220. In the example in FIG. 6, three input images IP1, IP2, and IP3 are acquired from the input image data GD, and are supplied to the representative color acquisition unit 220 and image synthesizing unit 270.

In Step S404, it is determined whether or not patterns of the decorative images are selected for each input image based on input from the user. When a pattern of a decorative image is not selected for each input image, the decorative image selecting unit 230 selects a plurality of decorative images with the same pattern but different colors in Step S406. If, on the other hand, patterns of decorative images are selected for each input image, the color and pattern of the decorative image are selected for each individual input image in Step S436.

In Step S408, it is determined whether or not the representative colors are similar colors. Here, "similar colors" refers to colors in which differences of hue (H) in the HSV color space are within a certain range (such as 30°). When the representative colors are all similar colors, the process advances to Step S422 to generate an output image giving a uniform impression.

FIG. 6 illustrates examples in which decorative images FP1 through FP3 having the same pattern are added to three input images IP1 through IP3. In this example, the representative colors of the two input images IP1 and IP2 are sky blue, but the representative color of the third image IP3 is the red of the flower. Since the representative colors are not all the same, the process moves to Step S410.

When it has been determined in Step S408 that the representative colors of the images are not similar colors, it is determined in Step S410 whether or not the user selects the color of the decorative image for each input image. When the user does not select the colors of the decorative images for each input image, the process moves to Step S422. If, on the other hand, the user selects the colors of the decorative images for each input image, the process moves to S412.

In Step S412, the decorative image selecting unit 230 displays a plurality of decorative image candidates with different colors based on the representative colors of the input images, and the user selects one. In Step S422, on the other hand, the decorative image selecting unit 230 displays a plurality of decorative image candidates with representative colors that will not produce a jarring effect with any of the representative colors of the input images, and the user selects one.

In Step S414, decorative images selected for each of the plurality of input images are synthesized by the image synthesizing unit 270. In Step S416, the output image generating unit 250 synthesizes the synthesized images to generate an output image. In the example in FIG. 6, the synthesized images obtained by the synthesis of decorative images FP1, FP2, and FP3 around the three input images IP1, IP2, and IP3 are placed on a background image BG. The image quality of the output images is adjusted as needed, and the images are then output in the form of print data PD to the printer 140.

Decorative image candidates suitable for the input images are thus selected from numerous decorative images based on the representative color FC of the decorative images FP and the representative color RC of the input images IP in the first embodiment. The burden imposed on the user in selecting decorative images is thus reduced, and desirable output results can be achieved.

In the first embodiment, the average colors were colors in which each component was the average value of the RGB components, but the luminance of the average colors is lower than the luminance of the easily discernible parts of the input image IP. Thus, when calculating the average color, a certain compensating value should be added to the luminance of the average color. The luminance compensation should compensate for the decrease in luminance involved in calculating the average color. For example, a constant compensation value resulting in an average color luminance that is virtually the same as the average luminance of the input image IP may be added to the luminance value of each average color. The compensating value may also be added according to the luminance value of the average colors.

B. Second Embodiment

Figure 7:
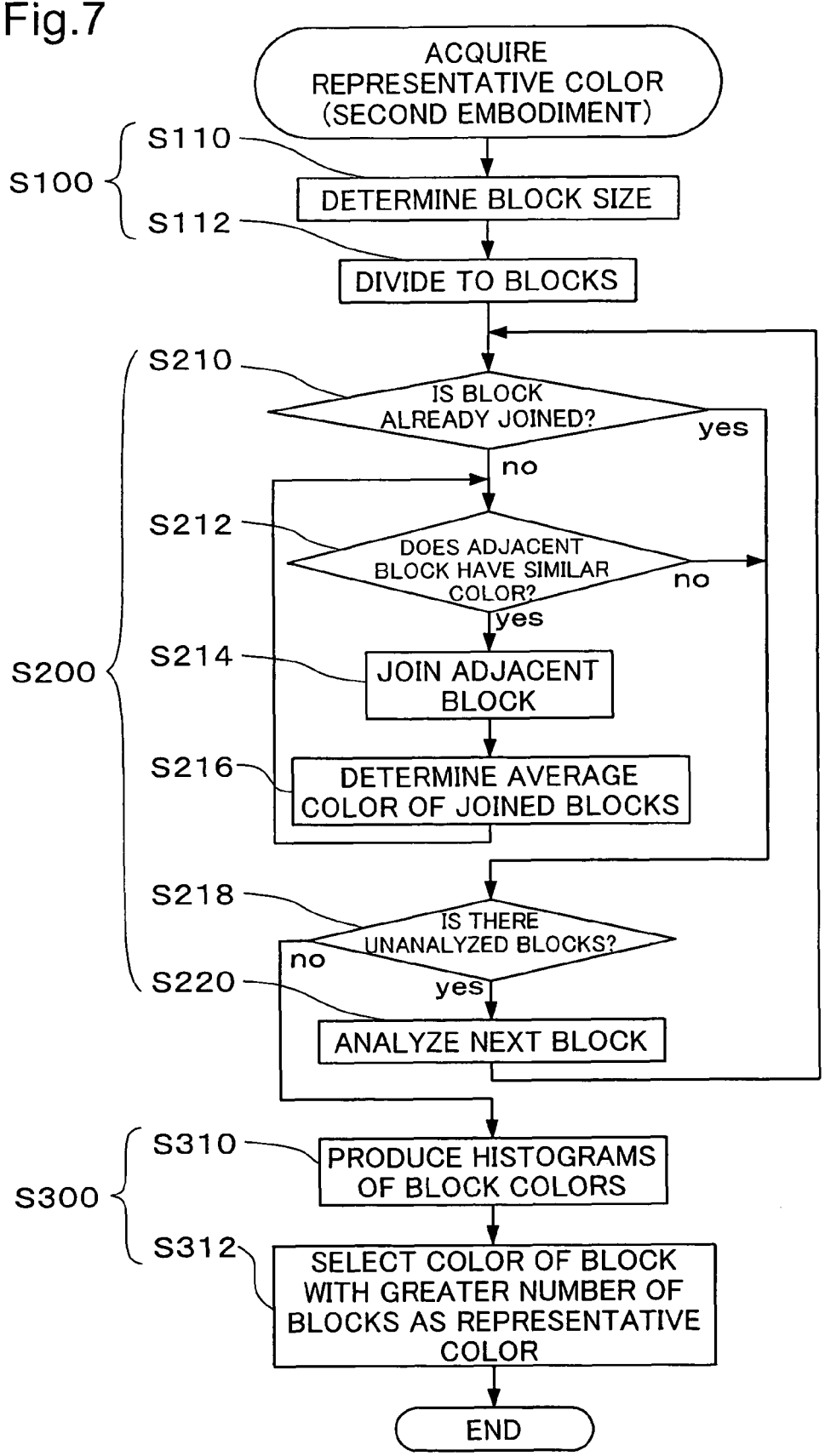
FIG. 7 is a flow chart for acquiring representative colors in a second embodiment.

FIG. 7 is a flow chart for acquiring a representative color in a second embodiment. FIGS. 8(a) through 8(e) illustrate the details of the process. The method for acquiring the representative color RC of the input images IP in the second embodiment is different from the method in the first embodiment. As the other structures and functions are virtually the same as in the first embodiment, they will not be further elaborated.

The representative color RC of input image IP is acquired by carrying out a pre-processing step S100, image analysis Step S200, and representative color determination Step S300, in that order. In Step S100, the input image IP is divided into a number of areas (referred to below as "blocks") suitable for image analysis. In Step S200, the input image IP is analyzed by each block thus divided, and in Step S300, the representative color RC is determined based on the results of the analysis in Step S200.

In Step S110, the image size of the input image IP is obtained, and the size of the blocks is determined according to the size of the input image IP. It is determined whether the number of horizontal pixels or the number of vertical pixels in the input image IP is smaller, and the block size is determined with reference to a table showing the correspondence between block size and pixel number, which is provided in the image processing device 200. In the example in FIG. 8(a), the entire input image IP is divided into 7×6 blocks. These divided blocks are referred to as the "source blocks." As used in the present Specification, "size" means the size of the image represented by the number of pixels in the horizontal and vertical directions.

Figures 8A, 8B, 8C, 8D, 8E:
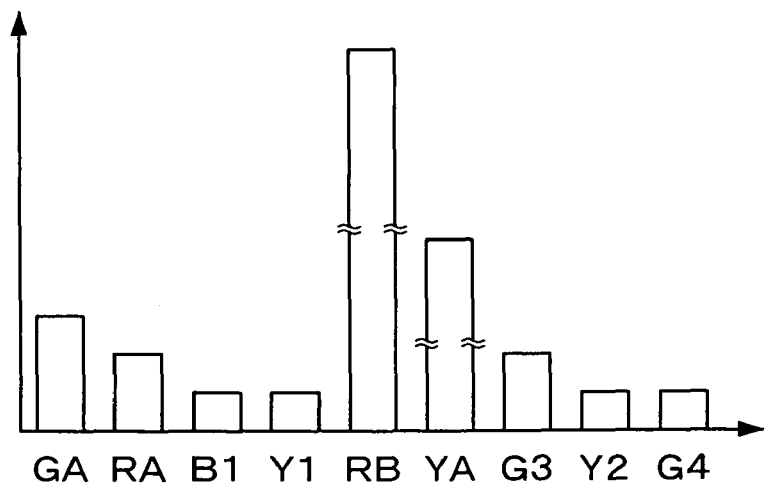
FIGS. 8(a) through 8(e) illustrate the details of the representative color acquiring process in the second embodiment.

In Step S112, the input image IP is divided into the block sizes determined in Step S110. The average color of pixels included in each block is then calculated for all of the divided blocks, and the average color is regarded as the color which each block has (referred to below as "block colors"). FIG. 8(a) illustrates the block color (1 letter and 1 number) calculated for each block. In FIGS. 8(a) through 8(e), block colors in which the first letter of the block colors represented by 2 characters is the same are similar colors, and block colors in which the first letter of the block color is different are not similar colors. In this embodiment, "similar colors" refers to colors in which differences of hue (H) in the HSV color space are within a certain range (such as 30°).

The blocks into which the input image IP has been divided in the pre-processing Step S100 are analyzed in sequence in the image analysis Step S200. Image analysis is done by joining adjacent blocks in which the block color is similar, and determining the number of source blocks belonging to the joined blocks.

In Step S210, it is determined whether the block being analyzed (referred to below as "target block") is a joined block. If the target block is a joined one, the process advances to Step S218. If the target block is not a joined one, the process moves to S212 to analyze the target block. In the example in FIG. 8(a), block L11 is the first target block after the image has been divided into blocks, and the block is thus not joined. Block L11 is therefore analyzed in Step S212 and thereafter.

In Step S212, it is determined whether the block color of the target block and the block color of a block adjacent to the target block are similar. If the block color of the target block and the block color of an adjacent block are similar (in such cases, the adjacent block is referred to as a "similar block"), the blocks are joined in Step S214. If the block color of the target block and the block color of an adjacent block are not similar, the process advances to Step S218.

In the example in FIG. 8(a), it is determined whether the block colors of the target block L11 and the adjacent blocks L12 and L21 are similar or not. Since block L12 has a block color R2 that is not similar to the target block L11, it is not a similar block and is not joined. Block L21, on the other hand, has the same block color G1 as the target block L11, and is thus determined to be a similar block which can be joined.

In Step S214, the target block and similar block are joined, forming a single block. In Step S216, the average color of the joined blocks is calculated. The average color of the joined blocks is a color in which the RGB components are the average values obtained when the RGB components of the target block and similar block have been weighted with the number of source blocks belonging to the target block and similar block, respectively.

In the example in FIG. 8(b), the target block L11 and similar block L21 are joined into a single block CL1. The block color of the joined block CL1 is the average color of the block colors of the source blocks L11 and L21. In FIG. 8(b), the block colors which the source blocks L1 and L2 have in block CL1 are the same color G1, and the block color of the joined block CL1 is thus G1.

After the blocks have been joined, the process returns to Step S212. The joined block is the target block, and it is determined whether the block colors of the adjacent blocks are similar to the block color of the target block or not. Steps S212, S214, and S216 are repeated until the block colors of adjacent blocks are not similar to the block color of the target block.

FIG. 8(c) illustrates the joining of block L22 which has a block color G2 and is adjacent to block CL1. As illustrated in FIG. 8(c), block L22 which is similar to block CL1 is also joined, forming a single joined block CL1a. The block color of the joined block CL1a is color GA, in which the RGB components are the average values obtained by weighting block colors G1 and G2 in a proportion of 2-to-1.

When the block colors of the target block and adjacent blocks are not similar, Step S218 is executed. In Step S218, it is determined if there are any unanalyzed blocks. When there are unanalyzed blocks, the unanalyzed block becomes the next target block by means of Step S220. Step S210 is then executed to analyze unanalyzed blocks.

The block joining process is repeated so that the source blocks (FIG. 8(a)) are reorganized as shown in FIG. 8(d). In FIG. 8(d), block colors indicated by 2 characters represent weighted average colors determined during the joining of blocks.

In Step S218, when it is determined that there are no unanalyzed blocks, the process moves to Step S310. In Step S310, a histogram is produced of the number of source blocks belonging to each block of the joined blocks. In Step S312, the histograms that have been produced are referenced to select a predetermined number of joined blocks with a greater number of source blocks. The block color(s) of the predetermined number of joined blocks thus selected is regarded as being the representative color of the input image IP. In this embodiment, the number of joined blocks selected is 1, but the number may be any number of 2 or more.

FIG. 8(e) shows the number of source blocks belonging to each joined block in the form of histograms. In this example, as illustrated in FIG. 8(e), the block with the greatest number of source blocks is the block with block color RB. The block color RB of the block with the greatest number of source blocks is thus the representative color RC of the input image IP.

This method for acquiring the representative color permits the detection of various areas in which the hue of the input image IP is different. It is thus possible to come up with representative colors that more accurately represent the characteristics of the input image.

C. Third Embodiment

Figure 9:
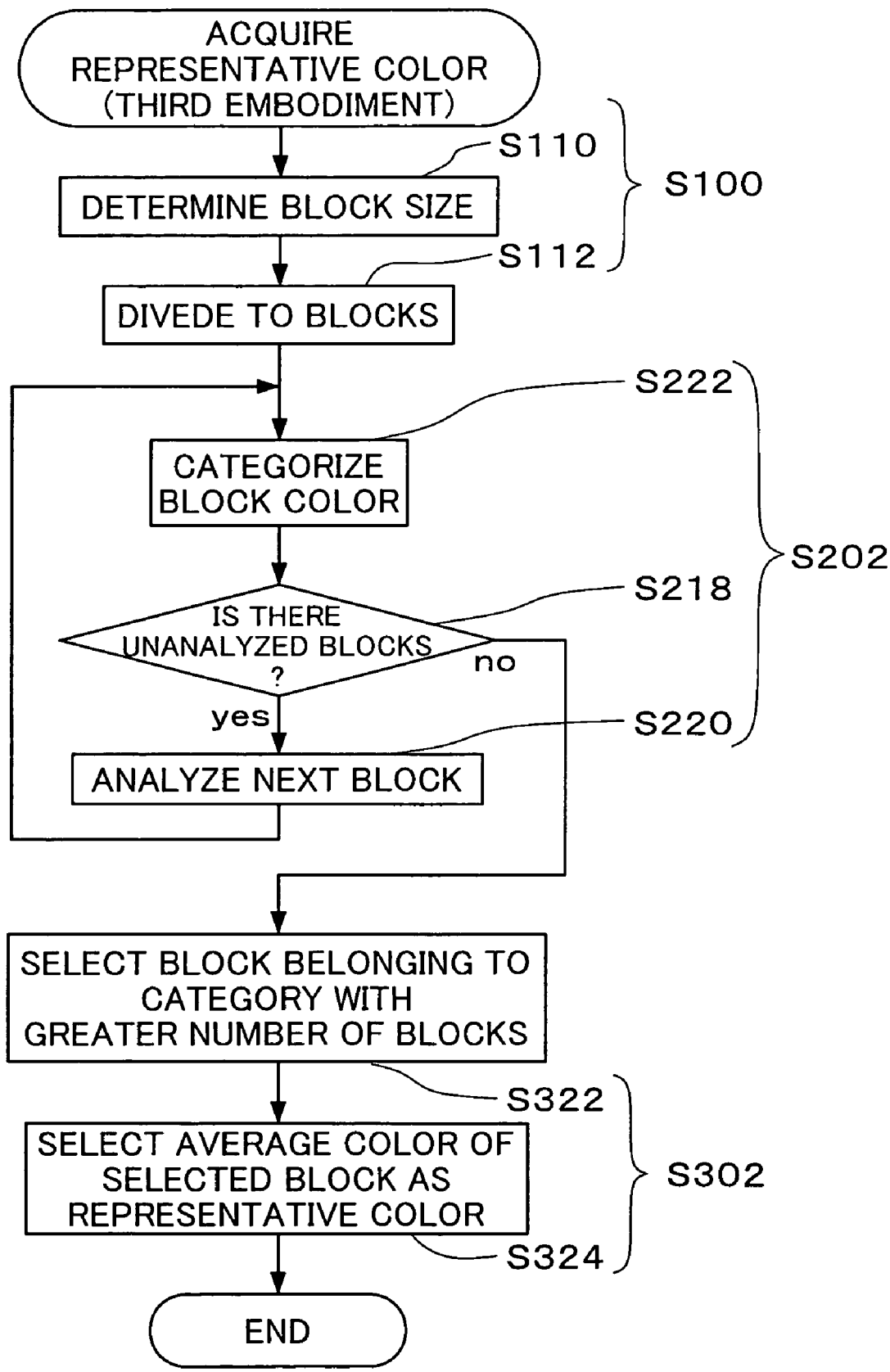
FIG. 9 is a flow chart for acquiring representative colors in a third embodiment.
Figure 10A:
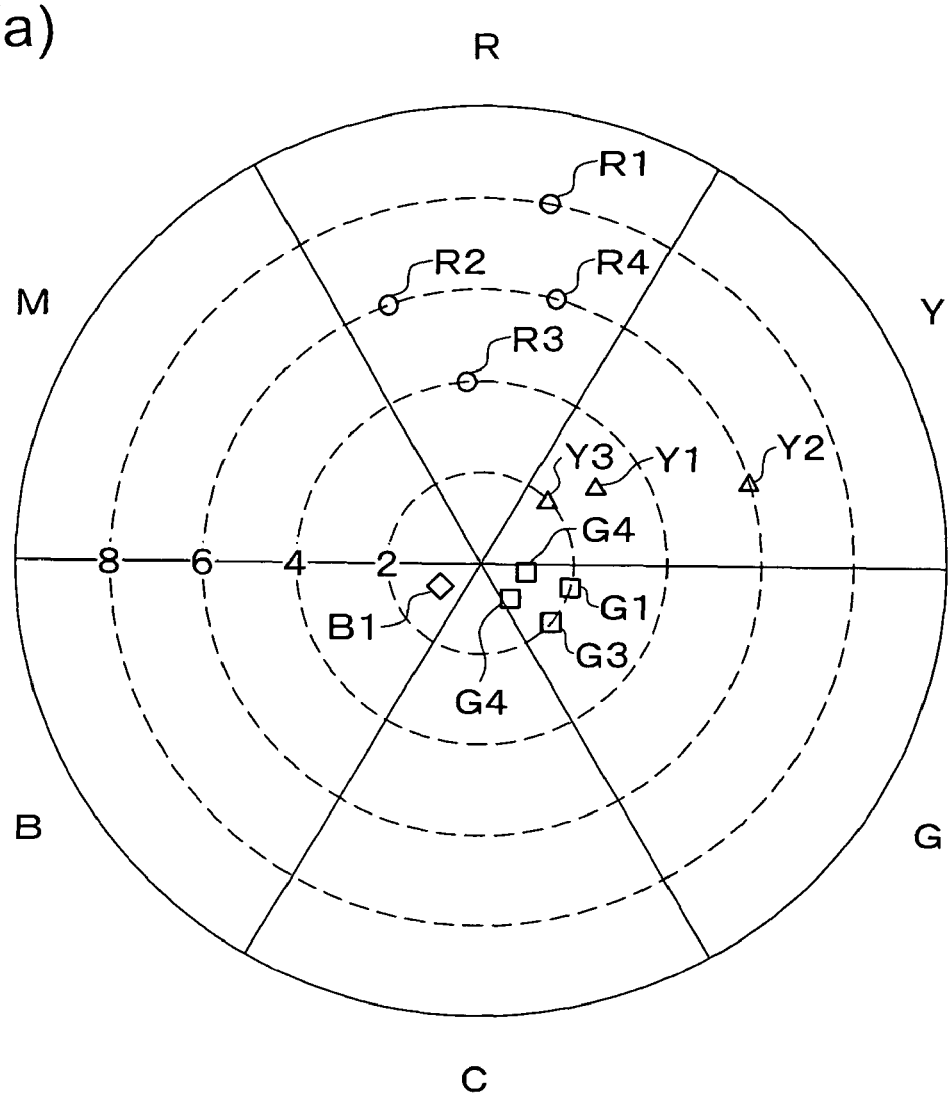
FIGS. 10(a) and 10(b) illustrate the details of the representative color acquiring process in the third embodiment.
Figure 10B:
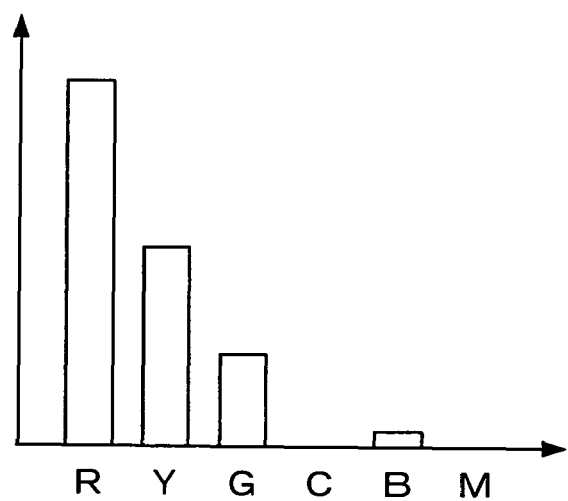

FIG. 9 is a flow chart for acquiring a representative color in a third embodiment. FIGS. 10(a) and 10(b) illustrate the details of the process. The image analyzing Step S202 in the third embodiment differs from the image analyzing Step S200 (FIG. 7) in the second embodiment in the way that a categorization Step S222 is performed instead of the block joining process Steps S210, S212, S214, and S216. As the other structures and functions are virtually the same as in the second embodiment, they will not be further elaborated.

In Step 222, the block color of the target block is converted to HSV color space in order to determine the hue value (H) in HSV color space, which is the index for categorization. A category to which the block color of the target block belongs is determined based on the hue value (H) that has been determined. Specifically, one category is each range into which the range allowing the hue value (H) to be obtained can be uniformly divided, and categories to which the hue value (H) of block colors belong depending on which range they are in may be determined.

In the examples in FIGS. 10(a) and 10(b), the blocks are classified into 6 categories R, Y, G, C, B, and M based on the hue value (H) of the block colors. For example, blocks having block colors R1, R2, R3, and R4 are classified as category R. The circumferential direction of the graph in FIG. 10(a) represents the hue value (H), and the radial direction represents the number of blocks for each block color. For example, points on the innermost circle (dashed line) indicate that there are 2 blocks.

In Step S322, a histogram is produced of the number of blocks belonging to each category. Based on the histogram that has been prepared, categories to which a certain number of more blocks belong (any integer of 1 or more) are selected (referred to below as "dominant categories"), and blocks belonging to the dominant categories are selected.

Then, in Step S324, the average colors of the blocks belonging to the dominant categories are determined. The average color determined for each dominant category is used as the representative color RC of the input image IP. In the examples in FIGS. 10(a) and 10(b), the category with the most number of blocks belonging to a category is the category of hue R. The representative color RC of the input image IP is thus the average colors of the blocks with block colors R1, R2, R3, and R4 belonging to the category of hue R.

The method for acquiring the representative color in the third embodiment is desirable because the time needed to acquire the representative color when there are a large number of blocks can be shorter than the method for acquiring the representative color in the second embodiment. On the other hand, the method for acquiring the representative color in the second embodiment is more desirable than the third embodiment in that the area in the input image IP occupied by colors similar to the representative color can be readily acquired.

In this embodiment, blocks are classified into categories in which the hue value (H) of the block colors are within the range of the hue value (H) of a category, but blocks can be categorized on the basis of other classification rules. For example, each block color may be arranged in three-dimensional color space and classified into a number of categories by what is referred to as a clustering process.

D. Fourth Embodiment

Figure 11:
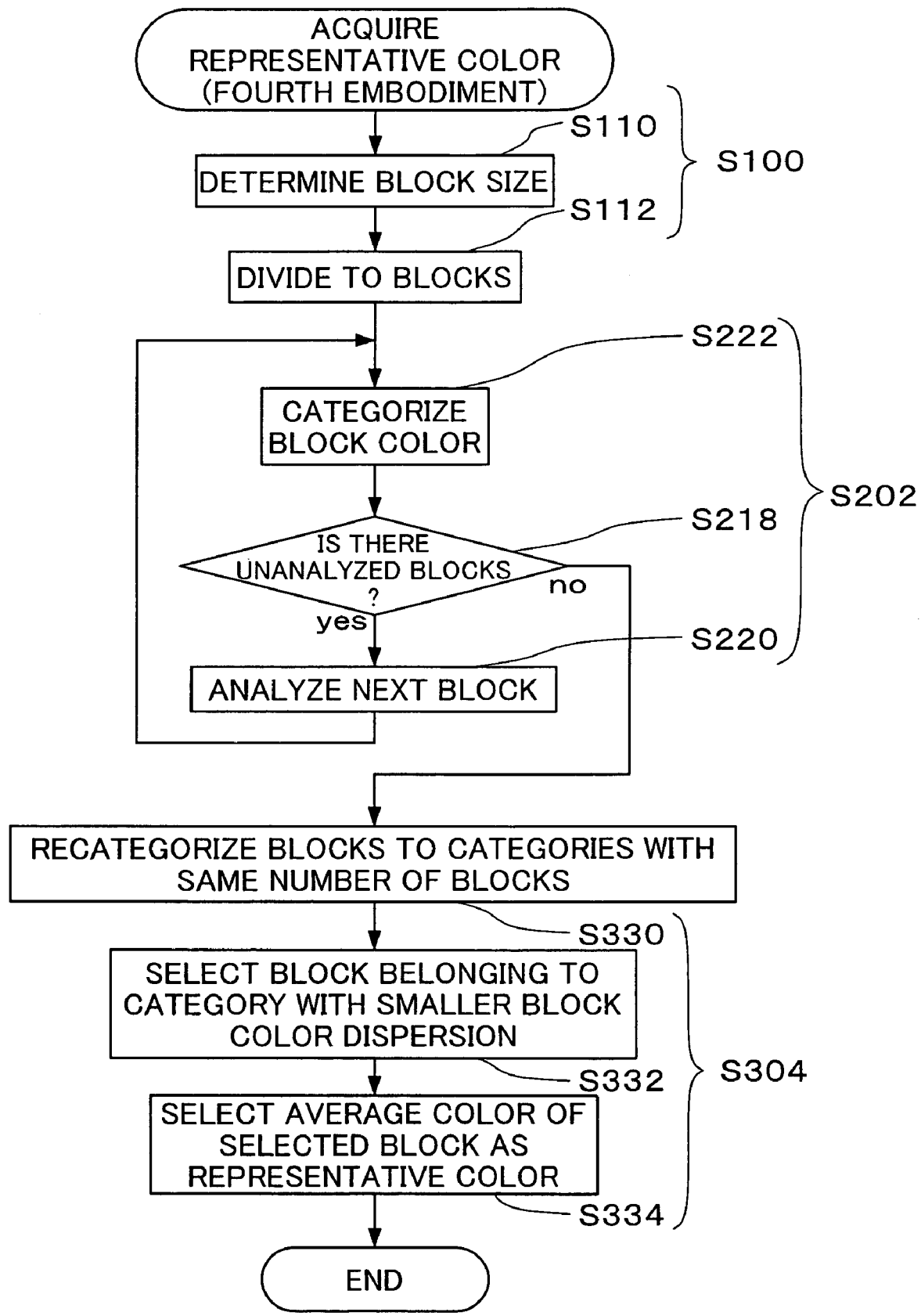
FIG. 11 is a flow chart for acquiring representative colors in a fourth embodiment.
Figure 12:
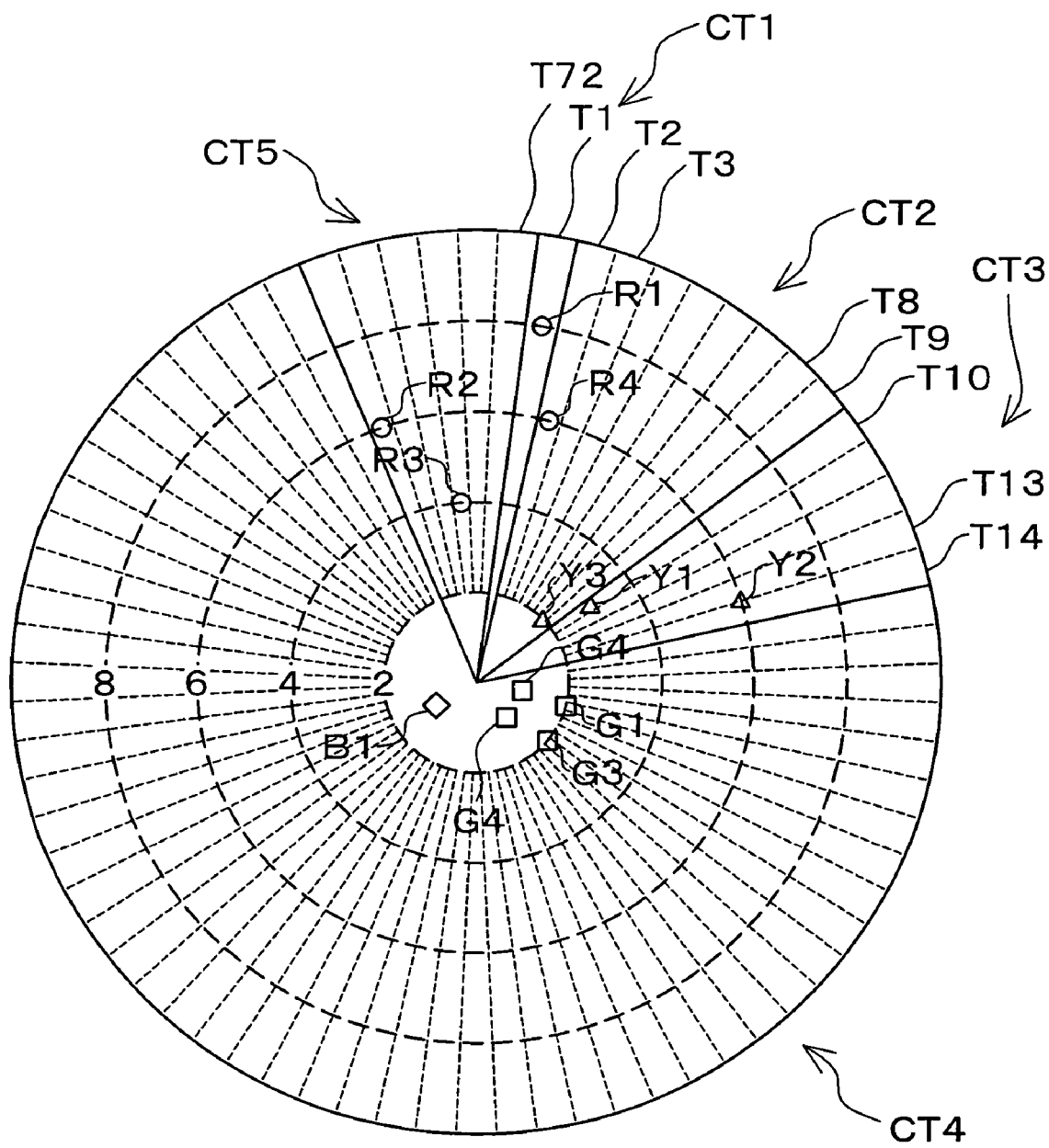
FIG. 12 illustrates the details of the representative color acquiring process in a fourth embodiment.

FIG. 11 is a flow chart for acquiring representative colors in the fourth embodiment. FIG. 12 illustrates the details of the process. The fourth embodiment is different from the third embodiment in that Step S330 for reclassifying categories is added to the representative color determining Step S304, and blocks used to determine the representative color are selected based on the reclassified category (Step S332). As the other structures and functions are virtually the same as in the third embodiment, they will not be further elaborated.

In the example in FIG. 12, blocks are classified into categories T1 through T72 based on the hue value (H) of the block colors in the same manner as in the third embodiment. The borders of the categories are indicated by dashed lines. The range of the hue values of the categories is 5°. The number of blocks belonging to categories is determined for each category. In the fourth embodiment, the categories are classified in smaller segments than the categories in the third embodiment in order to reclassify the categories.

In Step S330, blocks are reclassified into categories with about the same number of blocks belonging to each category (these categories are referred to below as "source categories") based on the results of classification obtained in the image analysis Step S202. Specifically, the source category to which the greatest number of blocks belong is selected, and source categories adjacent to that source category are joined. The category joining is repeated until the number of blocks belonging to joined categories reaches a predetermined number. When the number of blocks belonging to the joined category becomes the predetermined number, the category joining starts from a category adjacent to the joined category.

In FIG. 12, the source categories are reclassified so that there are 8 blocks belonging to joined categories. In the example in FIG. 12, the category to which the greatest number of blocks belong is the source category T1 (CT1) including the color R1. Because the number of blocks belonging to source category T1 is 8, the adjacent source category T2 is not joined.

Source category T2 adjacent to source category T1 has 6 blocks belonging to it, and source category T3 is therefore joined. Because 6 blocks belong to the joined categories of source categories T2 and T3, source category T4 is joined to the joined category. This continues until source categories T2 through T9 are joined, resulting in joined category CT2 to which 8 blocks belong. This continues until joined categories CT1 through CT5 are produced from source categories T1 through T72, and the blocks belonging to source categories are reclassified into joined categories CT1 through CT5.

In cases where the number of blocks belonging to joined categories is over the predetermined number when adjacent source categories are joined, it is determined whether or not they can be joined so that the number of blocks before and after adjacent category joining will be closer to the predetermined number. In the example in FIG. 12, 3 blocks belong to the joined category to which source categories T10 through T13 are joined, and 7 blocks belong to the joined category to which source categories T10 through T14 are joined. Source category T14 is thus joined to the joined category to which source categories T10 through T13 are joined, producing joined category CT3.

In Step S332, the range of the hue value (H) for each category is calculated as an index representing dispersion of blocks belonging to joined categories. Categories with a certain number (any integer of 1 or more) of calculated hue values with a narrow range are selected, and the blocks belonging to the selected categories are selected.

In the example in FIG. 12, category CT1 is the joined category with the smallest dispersion of block color hue value (H) of the blocks belonging to joined categories. The representative color RC of the input image IP is the average color of the block colors belonging to joined category CT1, that is, R1. The standard deviation or the like of the average colors of the blocks can also be used as an index representing a degree of dispersion of blocks belonging to joined categories. In general, categories can be selected when determining the representative color using any index showing the dispersion in a certain color space when the block colors are arranged in that color space.

The method for acquiring the representative color in the fourth embodiment is desirable because the time needed to acquire the representative color when there are a large number of blocks can be shorter than the method for acquiring the representative color in the second embodiment.

E. Fifth Embodiment

Figure 13:
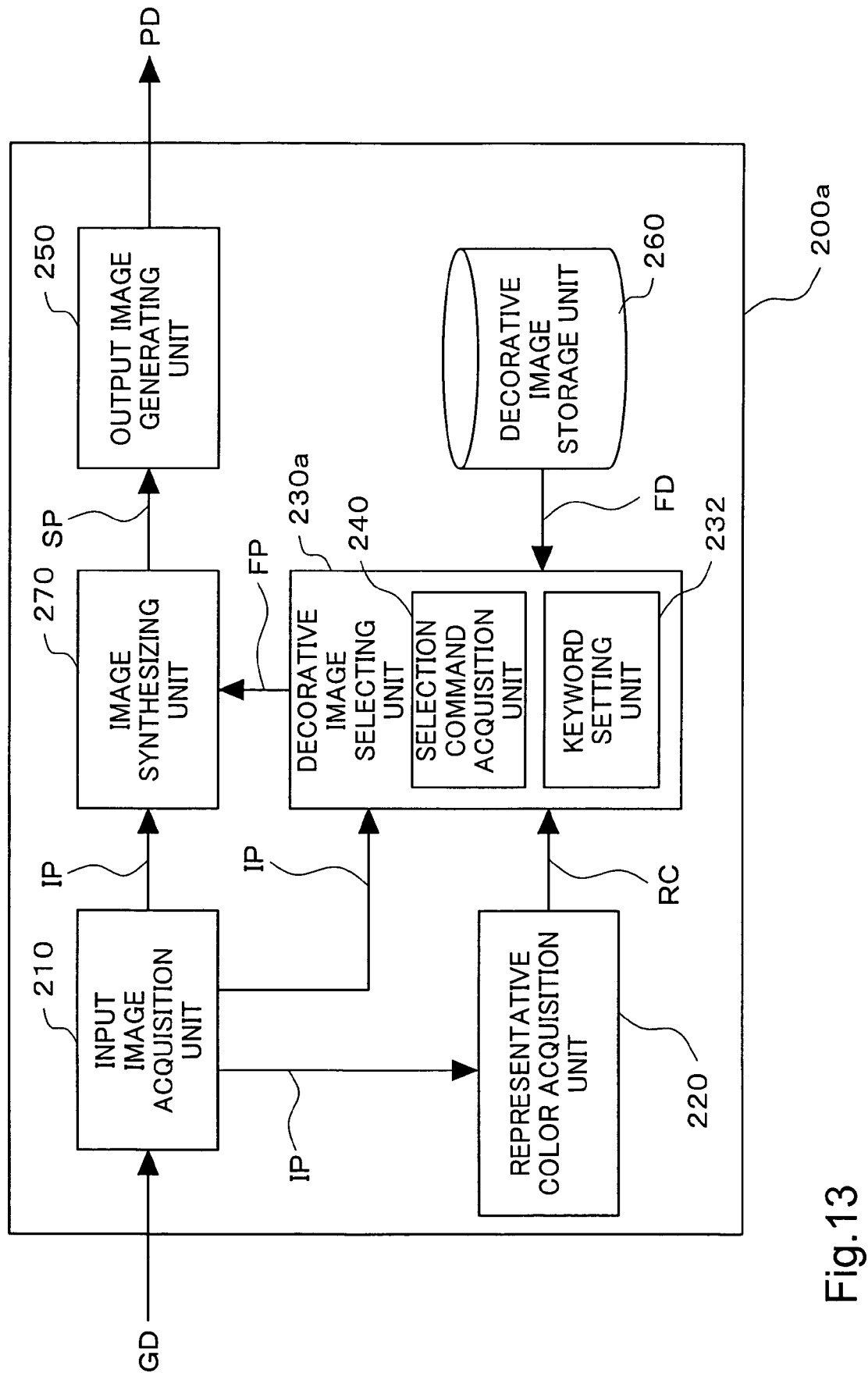
FIG. 13 is a block diagram of the structure of a image processing device 200a in a fifth embodiment.

FIG. 13 is a block diagram of the structure of an image processing device 200a in a fifth embodiment. It is different from the image processing device 200 (FIG. 2) in the first embodiment in that the decorative image selecting unit 230a is provided with a key word setting unit 232. As the other structures and functions are virtually the same as in the first embodiment, they will not be further elaborated.

The keyword setting unit 232 has the function of allowing the user to indicate a certain keyword characterizing the combination of the representative color RC of the input image IP and the representative color FC of the decorative image FP, and of receiving the input by the user indicating the keyword.

The decorative image selecting unit 230a acquires the representative colors of a plurality of decorative images in the same manner as in the first embodiment. The decorative image selecting unit 230a determines the preferred decorative image representative color (referred to below as "best color") based on the keyword KW and the representative color RC of the input image IP. The decorative image FP with the representative color FC close to the best color that has been determined is selected.

FIGS. 14(a) and 14(b) illustrate the determination of the best color based on the keyword KW and representative color RC of the input image IP. FIG. 14(a) shows a tone classification chart based on PCCS. The tones which are areas surrounded by the circles in FIG. 14(a) are designated with tone names characterizing the color belonging to those tones. The names of the tones in FIG. 14(a) are indicated by abbreviations represented by 1 to 4 letters.

FIG. 14(b) is a table of PCCS tones and their corresponding keywords. The column on the left side of the table in FIG. 14(b) shows the above noted tone abbreviations and tone names. The column on the right side of the table in FIG. 14(b) shows the keywords characterizing the tones. The key word setting unit 232 (FIG. 13) shows the keywords in the table to the user and allows the user to indicate a keyword KW.

For example, when the indicated keyword KW is "cute," then "pale" tone which corresponds to that keyword is selected from the table in FIG. 14(b). The "pale" tone corresponding to the keyword KW is the area indicated by hatching in the tone classification chart in FIG. 14(a). On the other hand, when the tone of the representative color RC of the input image IP acquired by the representative color acquisition unit 220 (FIG. 13) is "strong," for example, the representative color RC tone is the area surrounded by bold double lines in the tone classification chart in FIG. 14(a).

As noted above, the representative color RC of the input image IP and the representative color FC of the decorative image FP should be closer. The best color is therefore the color belonging to tones which are close to or the same as tones corresponding to keywords among the tones adjacent to the tone of the representative color RC. In the example in FIG. 14(b), the best color is determined as the color belonging to the "soft" tone near the tone corresponding to the keyword among the tones adjacent to the representative color RC.

In the fifth embodiment, the best color is determined based on the representative color RC of the input image IP and the keyword KW relating to tone, but keywords characterizing the combination of representative colors RC and FC can be used to determine the best color. For example, the correspondence between color scheme and keyword can be psychologically analyzed, and data prepared on the basis of the results can be used. The Color Image Scale (Shigenobu Kobayashi, November 2001 (Kodansha)) or the like can be used, for example, as data matching color schemes with keywords.

Keywords are thus indicated by the user in the fifth embodiment, and decorative image candidates are selected based on the indicated keyword. This allows the decorative image selecting unit 230a to select decorative image candidates according to the user's impression of the input image.

F. Sixth Embodiment

Figure 15:
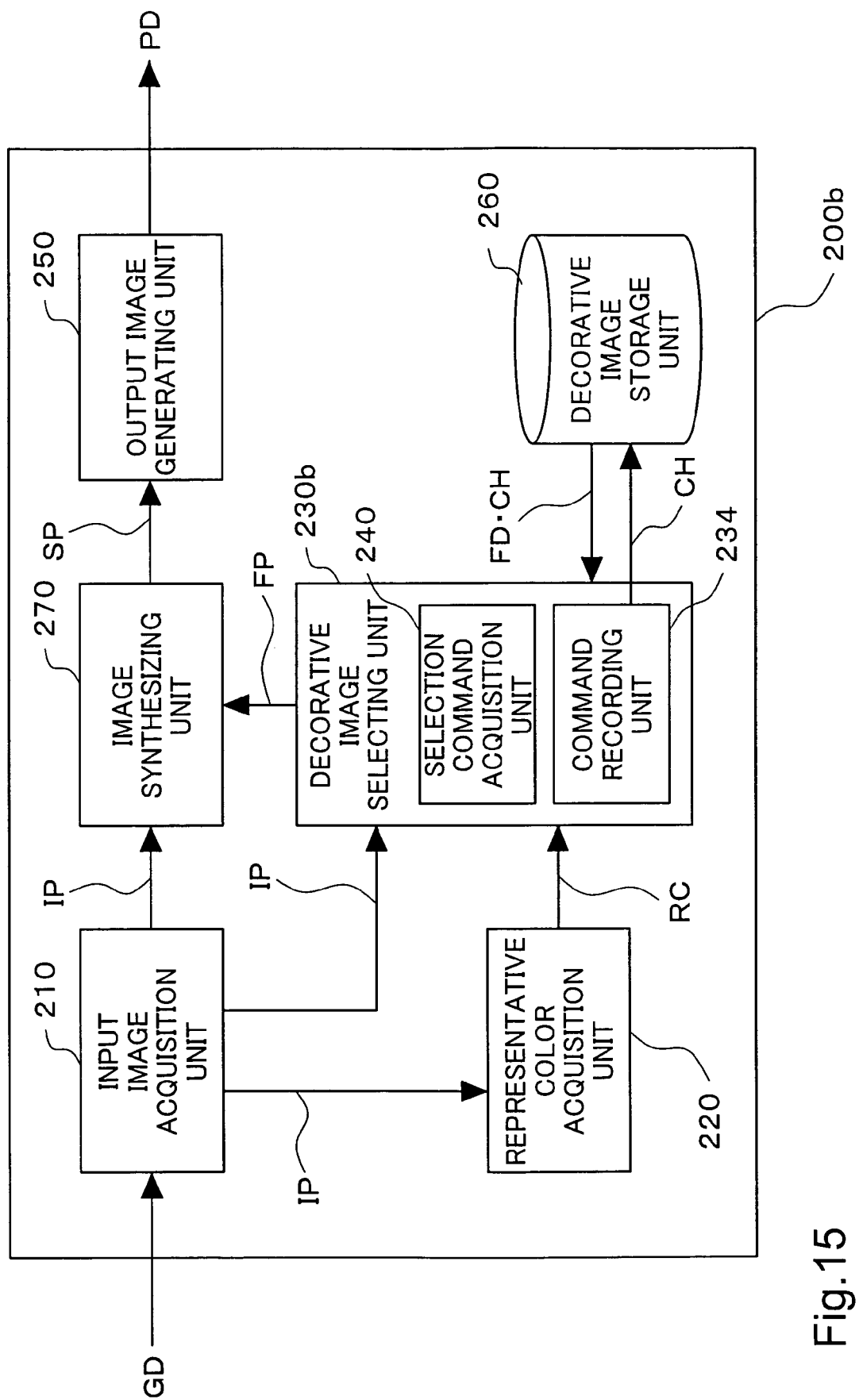
FIG. 15 is a block diagram of the structure of a image processing device 200b in a sixth embodiment.

FIG. 15 is a block diagram of the structure of an image processing device 200b in a sixth embodiment. It is different from the image processing device 200 (FIG. 2) in the first embodiment in that the decorative image selecting unit 230b is provided with a command recording unit 234. As the other structures and functions are virtually the same as in the first embodiment, they will not be further elaborated.

In the sixth embodiment, the decorative image selecting unit 230b selects decorative images based on the command history CH read from the decorative image storage unit 260 and the representative color RC of the input image IP. The decorative image FP to be added to the input image IP is determined according to the user commands obtained by the select command acquisition unit 240.

The command recording unit 234 acquires command data representing what kind of relationship exists between the representative color RC of the input image IP and the representative color FC of the decorative image FP selected by the user from the command details by the user. The command recording unit 234 updates the command history CH based on the command data that is obtained. The updated command history CH is recorded in the decorative image storage unit 260.

The command data recorded as the command history CH should be data showing what kind of relationship exists between the color schemes of the representative colors RC and FC. For example, it is possible to use data indicating whether or not the representative colors RC and FC are similar to each of the parameters of hue, saturation, and lightness. Keywords matching the representative colors RC and FC can also be used as command data recorded as the command history CH.

For example, when command data indicating that the user had selected a frame image FP with a representative color FC in which the hue was close to the representative color RC was recorded in the command history HC, the decorative image selecting unit 230b selects decorative image candidates with a representative color FC in which the hue is close to the representative color RC. On the other hand, when the data indicating that the user had selected a frame image FP with a representative color FC in which the hue was in contrast to the representative color RC was recorded in the command history HC, the decorative image selecting unit 230b selects decorative image candidates with a representative color FC in which the hue is in contrast to the representative color RC.

The decorative image selecting unit 230b in the sixth embodiment selects decorative image candidates that reflect the user's preference. The user can thus select decorative images from decorative image candidates of the user's own preference, thus reducing the burden of selecting desirable decorative images.

G. Variants

The invention is not limited to the above examples or embodiments, and can be worked in a variety of embodiments within the scope of the invention. The following variants are possible, for example.

G1. Variant 1:

In the above embodiments, the image processing devices 200, 200a, and 200b comprises a decorative image storage unit 260 for storing data on a plurality of decorative images, but the decorative image storage unit 260 may also be provided by a server or the like connected to a computer network, such as the Internet.

G2. Variant 2:

In the above embodiments, the representative color FC of decorative image FP is embedded as tag data in the decorative image data, but the representative color FC of the decorative image can be any data acquirable by the decorative image selecting unit 230. For example, the representative colors FC of decorative images may be stored in the decorative image storage unit 260 in the form of a database of representative colors FC matched to decorative images. The representative colors FC may also be acquired by analyzing decorative images stored in the decorative image storage unit 260 in the same manner as the above representative color acquisition unit 220.

G3. Variant 3:

In the above embodiments, the block size is determined according to the image size, but the block size may be any that results in a suitable number of blocks for image analysis. For example, the block size may be any fixed size regardless of image size. A block may have one pixel if the number of blocks is suitable for image analysis.

G4. Variant 4:

In the first embodiment, the average color of all pixels of the input image IP are used as the representative color RC, but the representative color may be any color characteristics of the input image IP. For example, colors in which the RGB components are values half the area of the histograms of the RGB components (these are referred to as "intermediate colors" in the present Specification) may be determined for all the pixels of the input image IP, and the resulting intermediate colors may be used as the representative color RC. Colors in which the HSV components are the values of the most frequently occurring HSV components (these are referred to as "most frequently occurring colors" in the present Specification) may be determined for all pixels in the input image IP, and the resulting most frequently occurring color may be used as the representative color RC.

Also, the above representative color acquisition unit 220 determines the representative colors from all pixels in the input image IP, but the representative color RC may also be determined from pixels with higher luminance than the average luminance of all pixels. Because areas with high luminance are more apparent than areas with low luminance, the representative color RC characterizing input image IP is preferably determined based on colors in areas of the input image IP which have a high luminance. On the other hand, determining the representative color RC from all pixels in the input image IP is more desirable in that there is no need to calculate the average luminance for comparison with the average luminance of each pixel, and the image process is easier.

G5. Variant 5:

In the above embodiments, the representative colors RC and FC are described as having only one color, but at least one of the representative colors RC and FC may have a plurality of colors. In such cases, the decorative image selecting unit 230 should select the decorative images when combinations of any one color among the plurality of representative colors RC of the input image and any one of the plurality of representative colors FC of the decorative image are desired as the plurality of decorative image candidates.

G6. Variant 6:

In the above embodiments, the decorative image selecting unit 230, 230a, and 230b selects decorative images FP having representative color FC in which the color has a hue similar to the representative color RC of the input image IP, but any decorative image FP that does not produce a jarring effect when combined with the input image IP can be selected. For example, decorative image FP may be selected in which the representative color FC is a color with a saturation or lightness close to that of the representative color RC. Decorative image FP in which the representative color FC has a tone close to that of the representative color RC may also be selected.

When the average luminance of the input image IP is at or over a certain level, decorative image FP in which the representative color FC has a luminance lower than the representative color RC may be selected. When the average luminance of the input image IP is under a certain level, decorative images FP in which the representative color FC has a luminance higher than the representative color RC may be selected. When the representative color RC of the input image IP has a high saturation, decorative images FP in which the saturation of the representative color FC is lower than the representative color RC may be selected.

G7. Variant 7:

In the above embodiments, hue values on a hue circle based on PCCS, HSV component values, or RGB component values are used in the classification and determination of the representative color, but the component values of any color system suitable for calculating average color and classifying color may be used.

G8. Variant 8:

In the above embodiments, decorative images FP to be added to input images IP are selected by the user from a plurality of decorative image candidates, but the decorative image selecting unit 230 can automatically select a decorative image FP without showing a plurality of decorative image candidates to users for selection.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing method for adding decorative frame images to a plurality of input images individually, comprising:
   (a) acquiring a representative color for each of the input images by analyzing image data representing the input images;
   (b) selecting a decorative frame image to be added to each of the input images from a plurality of decorative frame images based on the representative color for each of the input images; and
   (c) generating an output image by individually synthesizing the decorative frame images with a same image pattern and the input images, wherein
   the step (b) includes selecting a plurality of decorative image candidates based on the representative color of each input image so that if the representative color for each of the input images is similar then a plurality of similar decorative image candidates is selected for all input images, and if not then the plurality of decorative image candidates is selected for each input image, displaying on a display a selection screen allowing a user to select the decorative frame image from the plurality of decorative image candidates, and recording a command history related to selection of the decorative frame image by the user,
   the plurality of decorative image candidates is selected based on the command history, a representative color of each decorative frame image, and the representative color of each input image, and
   each of the steps of the image processing method is executed by a microprocessor.

2. The image processing method according to claim 1, wherein
   the step (b) includes selecting the decorative frame image based on the representative color of each input image and a representative color of each decorative frame image among the plurality of decorative frame images.

3. The image processing method according to claim 2, wherein
   the step (b) includes selecting the decorative frame image having a representative color close to the representative color of each input image.

4. The image processing method according to claim 1, wherein
   the step (b) includes allowing a user to set a keyword related to a color scheme, wherein
   the decorative frame image is selected based on the color scheme related keyword, a representative color of the decorative frame image, and the representative color of each input image.

5. The image processing method according to claim 1, wherein
   the step (b) includes selecting a plurality of decorative image candidates based on the representative color of each input image, and displays on a display a selection screen allowing a user to select the decorative frame image from the plurality of decorative image candidates.

6. The image processing method according to claim 1, wherein
   the step (a) includes calculating the representative color of each input image from color of input image pixels which have a luminance more than an average luminance value.

7. An image processing apparatus for adding decorative frame images to a plurality of input images individually, comprising:
   a decorative image storage unit configured to store a plurality of decorative frame images;
   a representative color acquisition unit configured to acquire a representative color for each of the input images by analyzing the input images;
   a decorative image selecting unit configured to select the decorative frame image to be added to each of the input images from the plurality of decorative frame images based on the representative color for each of the input images; and
   an output image generating unit configured to generate an output image by individually synthesizing the decorative frame images with a same image pattern and the input images, wherein
   the decorative image selecting unit selects a plurality of decorative image candidates based on the representative color of each input image so that if the representative color for each of the input images is similar then a plurality of similar decorative image candidates is selected for all input images, and if not then the plurality of decorative image candidates is selected for each input image, displays on a display a selection screen allowing a user to select the decorative frame image from the plurality of decorative image candidates, and records a command history related to selection of the decorative frame image by the user, and
   the plurality of decorative image candidates is selected based on the command history, a representative color of each decorative frame image, and the representative color of each input image.

8. A computer program product for adding decorative frame images to a plurality of input images individually, comprising:
   a computer-readable medium; and
   a computer program stored on the computer readable-medium, the computer program including:
   a first program for causing a computer to acquire a representative color for each of the input images by analyzing image data representing the input images;
   a second program for causing the computer to select the decorative frame image to be added to each of the input images from a plurality of decorative frame images based on the representative color for each of the input images; and
   a third program for causing the computer to generate an output image by individually synthesizing the decorative frame images with a same image pattern and the input images, wherein the second program includes causing the computer to select a plurality of decorative image candidates based on the representative color of each input image so that if the representative color for each of the input images is similar then a plurality of similar decorative image candidates is selected for all input images, and if not then the plurality of decorative image candidates is selected for each input image, display on a display a selection screen allowing a user to select the decorative frame image from the plurality of decorative image candidates, and record a command history related to selection of the decorative frame image by the user, and wherein the plurality of decorative image candidates is selected based on the command history, a representative color of each decorative frame image, and the representative color of each input image.

* * * * *